United States Patent [19]

Patterson

[11] 4,214,243

[45] Jul. 22, 1980

[54] HARMONIC DETECTOR FOR TRAFFIC RADAR

[75] Inventor: Robert E. Patterson, Lee's Summit, Mo.

[73] Assignee: M. P. H. Industries, Inc., Chanute, Kans.

[21] Appl. No.: 943,199

[22] Filed: Sep. 18, 1978

[51] Int. Cl.² ............................................. G01S 9/44
[52] U.S. Cl. ................................... 343/8; 343/5 HM
[58] Field of Search ............................. 343/5 HM, 8

[56] References Cited

U.S. PATENT DOCUMENTS

| 3,118,139 | 1/1964 | Durstewitz | 343/8 |
| 3,187,329 | 6/1965 | Midlock | 343/8 |
| 3,936,824 | 2/1976 | Aker et al. | 343/8 |

*Primary Examiner*—Malcolm F. Hubler
*Attorney, Agent, or Firm*—D. A. N. Chase

[57] ABSTRACT

A traffic radar unit capable of operation from a moving patrol vehicle has a receiver provided with phase recognition circuitry that prevents the display of "ghost" readings. After initial processing of the incoming composite Doppler signal, the phase recognition circuitry receives logic conditioned, low and high frequency speed signals derived from the Doppler signal and produces an abort command to prevent the determined target speed from being displayed if the phase relationship between the two speed signals remains constant for a predetermined number of cycles of the low frequency speed signal. The latter signal corresponds to a low frequency component of the Doppler signal representing the speed of the patrol car, but the high frequency signal may be a harmonic that would produce an invalid reading. The circuitry employs a serial to parallel type shift register having a data input receiving the high frequency speed signal. The register is clocked by the low frequency speed signal. If all outputs of the shift register assume the same logic level, phase coherence (and hence a harmonic relationship) is recognized and the display is aborted to prevent ghost readings from stationary objects such as road signs; mixed outputs indicate a valid target (moving target vehicle) and the reading is displayed.

9 Claims, 4 Drawing Figures

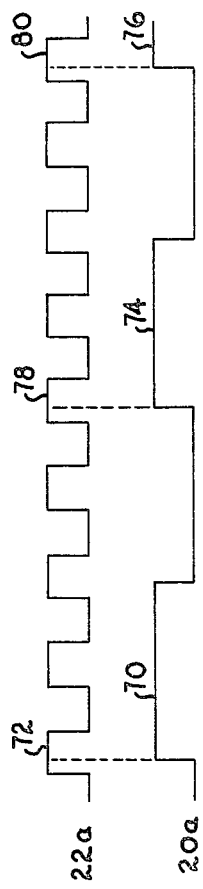
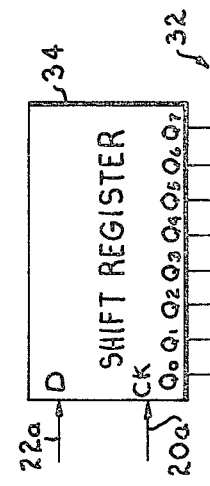
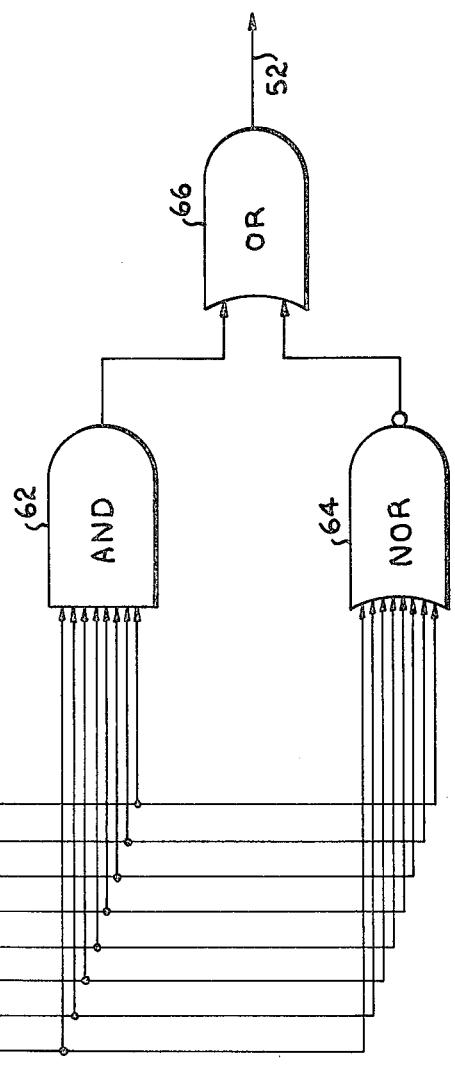

HARMONIC DETECTOR FOR TRAFFIC RADAR

This invention relates to improvements in traffic radar equipment and, in particular, to an improved Doppler radar receiver for use in moving radar traffic control applications where unwanted return signals reflected from large or electrically nonlinear objects may be encountered.

The application of Doppler radar principles to traffic control and vehicle speed determination is well known, and in recent years Doppler radar units have enjoyed widespread use by police departments and other law enforcement agencies. More advanced traffic radar devices are of the so-called "moving radar" type which permits the unit to be operated while the patrol vehicle is moving, typically in one lane of a highway while surveilling oncoming traffic in the other lane. In this operational mode, the radar receiver receives a composite Doppler signal having a high frequency component returned from the target vehicle and a low frequency component representing the speed of the patrol vehicle itself. By a conventional subtraction process, the speed of the patrol vehicle is deducted from the closing speed to determine the actual speed of the oncoming target.

Present-day traffic radar receivers also employ circuitry in both the high frequency or closing speed channel of the receiver and the low frequency or patrol speed channel for validating the received Doppler components. This may be accomplished by various means, such as through the use of a phase-locked loop in each channel to be certain that the signal component under consideration has a constant frequency rather than a variable frequency characteristic of noise.

However, the validation approaches heretofore employed in traffic radar receivers, although discriminating against noise, do not discriminate against signals that are an exact harmonic of the frequency representing the speed of the moving patrol car. A particular problem in traffic radar applications is that large or electrically nonlinear objects such as signs, telephone and power line guy wires, bridges and parked trucks reflect large amounts of the transmitted radar signal or harmonics thereof in sufficient magnitude to cause ghost readings to be indicated by the radar receiver, such readings being equal to or multiples of the moving patrol car's own speed. These ghost or sign readings can be minimized by making the radar receiver as linear as possible with as wide a dynamic range as possible, but inadvertent diodes such as galvanized wires, etc. still can produce multiples of the patrol car's own speed on occasion.

SUMMARY OF THE INVENTION

It is, therefore, the primary object of the present invention to provide a traffic radar receiver which is immune to the ghost reading problem discussed hereinabove.

As a corollary to the foregoing object, it is an important aim of this invention to provide a traffic radar receiver as aforesaid which is capable of recognizing the constant phase relationship that exists between signals representative of a yet unidentified but unwanted target and the patrol car itself, and which will not display a speed reading under such conditions.

Still further, it is an important object of this invention to provide a traffic radar receiver as aforesaid which is not blind to a normal target (a moving target vehicle) even though such target may be moving at a speed which is approximately an integer multiple of the patrol car speed.

Additionally, it is an important object of this invention to provide such a traffic radar receiver which rejects ghost readings but which does not require periodic adjustment or alignment to maintain this rejection characteristic.

Furthermore, it is an important and specific object of this invention to provide phase detector circuitry for such receiver wherein phase recognition is accomplished by digital means which operates reliably under all ambient conditions and irrespective of component aging, is relatively uncomplex and inexpensive, functions entirely independently of the other stages of the receiver, and may be universally employed in current receiver designs without modification.

More particularly, in the present invention a phase detector is employed in the receiver of a digital traffic radar. A high frequency speed signal (normally representative of the closing speed of the target) and a low frequency speed signal (representing the patrol car speed) are derived from the composite Doppler return signal. These two speed signals are logic conditioned by processing circuitry and are fed to the phase detector and also to a subtracter as is conventional in order to obtain a difference signal representative of target speed. Although a target vehicle may be moving at a speed which causes the Doppler signal returned therefrom to be an integer multiple of the patrol car speed, the phase relationship between such Doppler component and the Doppler component representing the speed of the patrol car will not be constant since as a practical matter one of the cars will change speed slightly and will destroy any exact harmonic relationship that may exist for an instant. This is in contrast to the Doppler signals returned from electrically nonlinear objects. Such signals have constant frequencies that are exact integer multiples of the frequency of the Doppler component representing the patrol car speed; accordingly, a constant phase relationship exists between such a signal and the patrol car component. The phase detector recognizes this phase coherence if it is present and generates an abort command to blank the target speed display. This is accomplished in the detector circuitry by feeding the high frequency speed signal to the data input of a serial to parallel type shift register having parallel outputs, and clocking the register with the low frequency speed signal. If all output bits of the register are either at the high or at the low logic level, the abort command is generated. The target is identified as a moving target vehicle if there is a mixture of high and low level outputs from the register since no phase coherence is present, and the abort command in this case is not produced.

The phase detector likewise recognizes the harmonics of strong signals reflected from unusually large objects such as road signs and parked trucks. In this circumstance the reflected signal is at the fundamental frequency, but overloading in the front end of the receiver may produce internally generated harmonics as the linear range of the receiver stages, such as the mixer diode, is exceeded. Should this occur, exact harmonics of the low frequency speed signal will be present the same as if the harmonics were generated externally by reflections from electrically nonlinear objects.

DESCRIPTION OF THE DRAWINGS

FIG. 3 is a logic diagram showing an alternative form of phase detector; and

FIG. 4 is a wave form diagram illustrating exemplary harmonically related speed signals.

DETAILED DESCRIPTION

Figure 1:
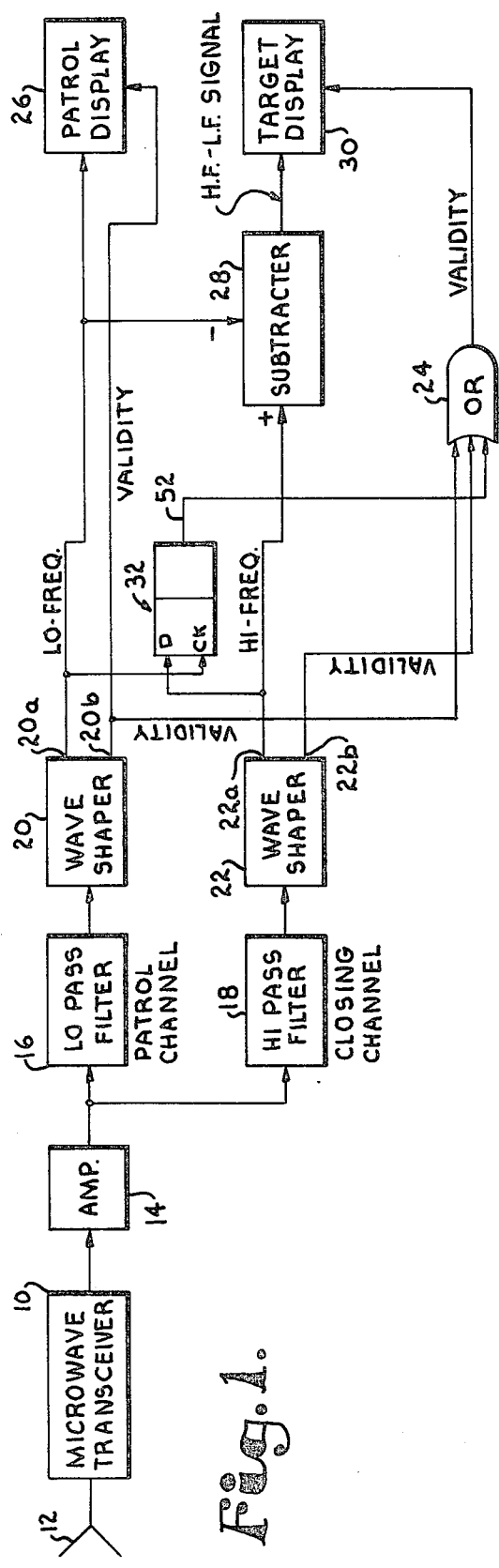
FIG. 1 is a block diagram of a traffic radar unit employing the improvement of the present invention in the receiver thereof.

Referring initially to FIG. 1, a digital traffic radar is illustrated of a conventional type used on a patrol car or other surveillance vehicle, and which is capable of displaying the speed of a target vehicle while the patrol vehicle is moving. In addition to the conventional circuit stages illustrated, the system of FIG. 1 shows the manner in which the improvement of the present invention is incorporated into the radar receiver, as will be discussed. It should be understood that FIG. 1 shows only the stages of the system necessary for an understanding of the present invention, and is not intended to show the system in detail nor to illustrate the mode of operation thereof when the patrol car is stationary.

A microwave transceiver 10 is coupled with a directional antenna 12 and produces a microwave signal which is directed by the antenna 12 toward a target vehicle or in a direction to intercept the path of such vehicle. A typical frequency of transmission is 10,525 MHz. The antenna 12 receives reflected signals in the conventional manner and the same are suitably amplified by an amplifier stage 14 and fed to a low pass filter 16 and a high pass filter 18. The Doppler return signal is a composite signal having relatively high and low frequency components which, in typical enforcement applications, represent the closing speed of the target vehicle and the speed of the patrol car. These two components are separately processed in the patrol and closing channels by wave shapers 20 and 22 respectively to provide a low frequency, logic conditioned speed signal at the output 20a of wave shaper 20, and a high frequency, logic conditioned speed signal at the output 22a of wave shaper 22. By "logic conditioned" it is meant that each sinusoidal Doppler component is formed into a square wave as illustrated in FIG. 4 by the two exemplary wave forms corresponding to outputs 20a and 22a. These two output signals will be referred to hereinafter as the low frequency speed signal and the high frequency speed signal respectively. It should be understood that the frequency of each of the speed signals may be either equal to or proportional to the frequency of the corresponding Doppler signal component, depending upon the particular receiver design employed in practice.

The wave shaper 20 also has a validity output 20b which is connected to one input of a three-input OR gate 24, and to a patrol display 26. Similarly, the wave shaper 22 in the closing channel has a validity output 22b which is connected to another input of the OR gate 24. As is conventional, each of the wave shapers 20 and 22 is provided with a validation circuit for discriminating between a true incoming Doppler component and random noise. Binary logic is employed, and so long as the output 20b or 22b is at the low logic level, the corresponding component is determined to be valid. The presence of a high logic level at output 20b is a "miss" indication (invalid signal) in the patrol channel. Likewise, the presence of the high logic level at output 22b indicates a miss in the closing channel (high frequency component invalid).

The low frequency speed signal from wave shaper output 20a is fed to the patrol display 26 and to a subtractor 28. The high frequency speed signal from wave shaper output 22a is also fed to an input of the subtracter 28. The output of the subtracter 28 is a difference frequency indicative of the speed of the target vehicle obtained by subtracting the patrol car speed from the closing speed, and is fed to a target speed display 30. Both the patrol and the target displays 26 and 30 are digital readouts in view of the officer or other operator. Typically, the target display 30 is provided with an adjustable violation setting so that an audible alarm will sound and the speed indication will hold if a target vehicle reaches or exceeds the preset violation speed.

Figure 2:
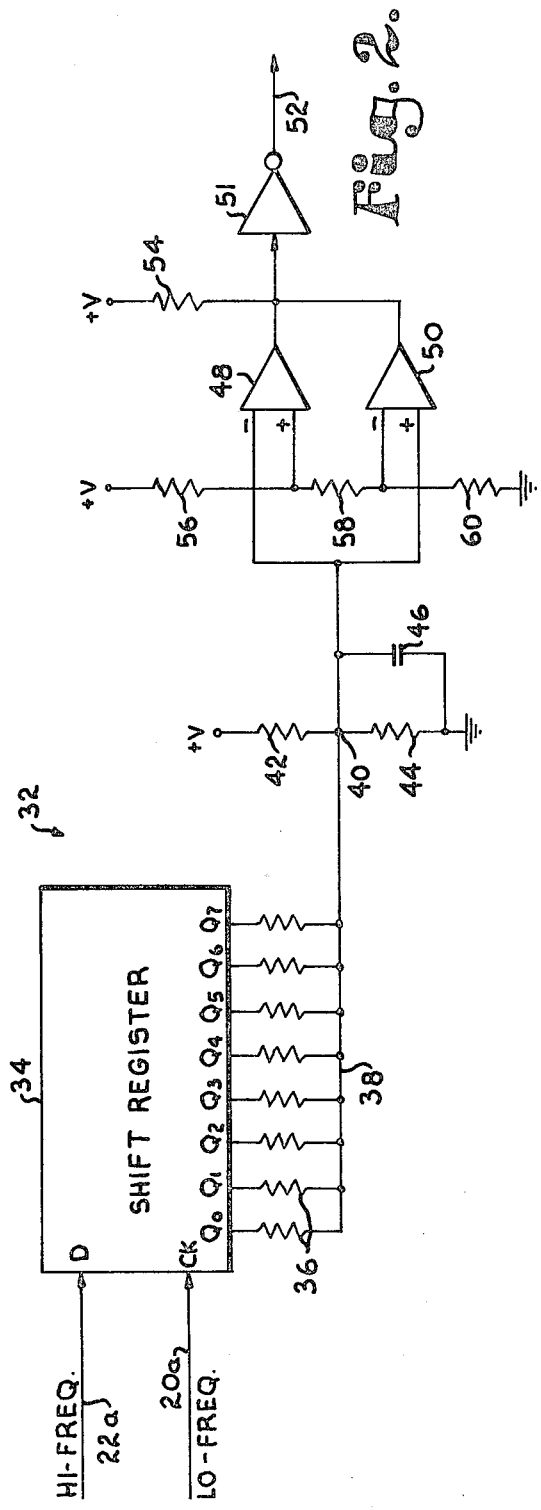
FIG. 2 is an electrical schematic diagram of one embodiment of the phase detector employed in the receiver.

The improvement of the present invention comprises a phase detector 32 connected between the wave shaper outputs 20a, 22a and the third input of the OR gate 24. Referring to FIG. 2, an eight-bit shift register 34 of the serial to parallel type has a data input "D" connected to wave shaper output 22a, and a clock input "CK" connected to wave shaper output 20a. The shift register 34 has eight parallel outputs $Q_0$, $Q_1$, $Q_2$, $Q_3$, $Q_4$, $Q_5$, $Q_6$ and $Q_7$. Eight resistors 36, all of the same ohmic value, extend from respective outputs $Q_0$ through $Q_7$ to a common lead 38 that presents a junction point 40 between a pair of series resistors 42 and 44 of equal ohmic value. As is clear in FIG. 2, the series resistors 42 and 44 are connected from a positive supply terminal (+V) to circuit ground. Typically, the supply voltage is 10 volts DC. A capacitor 46 is connected in parallel with resistor 44 and serves an integrating function as will be explained.

Dual voltage comparators 48 and 50 in cooperation with their associated circuitry are employed as a window comparator and function logically as an eight-input AND gate and an eight-input NOR gate simultaneously. Each voltage comparator 48 and 50 has an open collector output connected by an inverter 51 to a common output lead 52 which is connected to the third input of the OR gate 24 in FIG. 1. A pull-up resistor 54 is connected from the positive supply to the comparator outputs. Three series resistors 56, 58 and 60 are connected between the positive supply and ground and comprise a voltage divider that defines a voltage window. The junction between resistors 56 and 58 is connected to the "+" input of comparator 48, and the junction point between the resistors 58 and 60 is connected to the "−" input of the comparator 50. The junction 40 between the resistors 42 and 44 presents a summing point which is connected to and common with the "−" input of comparator 48 and "+" input of comparator 50.

Representative values of the various passive circuit elements in FIG. 2 are as follows:

Resistors 36: 100,000 ohms each
Resistors 42 and 44: 33,000 ohms each
Capacitor 46: 1 mfd
Resistor 56: 15,000 ohms
Resistor 58: 33,000 ohms
Resistor 60: 15,000 ohms An alternative embodiment of the phase detector 32 is illustrated in FIG. 3. Instead of the analog voltage comparators employed in FIG. 2, the eight outputs $Q_0$ through $Q_7$ of the shift register 34 are connected to respective inputs of an eight-input AND gate 63, and are also connected to respective inputs of an eight-input NOR gate 64. Accordingly, the AND gate 62 and the NOR gate 64 have parallel inputs responsive to the corresponding outputs of the shift register 34. The output of the AND gate 62 and the output of the NOR gate 64 are connected to respective inputs of an OR gate 66, the output thereof appearing on the output lead 52.

OPERATION

The digital traffic radar of FIG. 1 is employed in the usual manner as previously mentioned. Due to the Doppler effect, the reflected signal received by the antenna 12 is at a frequency which differs from the frequency of the transmitted signal by an amount proportional to the speed of the target vehicle. In moving radar applications where the radar unit of FIG. 1 is employed on a patrol car that is in motion, a composite Doppler signal is received having a high frequency component returned from the target and a low frequency component returned from the stationary environment and which represents the speed of the patrol vehicle itself. For a transmitted frequency of 10,525 MHz, the difference signal from the output of subtracter 28 (representing the target speed) has a frequency equal to the speed of the target vehicle in miles per hour multipled by 31.4. The reciprocal of this is 31.8 milliseconds; thus a digital counter having a count gate period of 31.8 msec. will count a number of pulses equal to the speed of the target vehicle in miles per hour, and this count is displayed by the target display 30. Another approch employed in conventional digital traffic radar is to use a count gate period that is an integer multiple of 31.8 milliseconds, and then divide the resultant count by such integer to display miles per hour. A count gate of twice the 31.8 millisecond period, for example, provides resolution to the nearest one-half mile per hour.

Referring to FIGS. 2 and 4, the high frequency speed signal (closing speed) from wave shaper output 22a is, in the illustration, exactly four times the frequency (fourth harmonic) of the low frequency speed signal (patrol car speed) from wave shaper output 20a. Furthermore, it may be appreciated that the square wave speed signals shown in FIG. 4 have a constant phase relationship. The illustrated high frequency speed signal from output 22a is representative of a square wave that would be derived either from a Doppler signal component reflected from an electrically nonlinear object such as a power line guy wire, or from a very strong signal reflected from a large object such as a road sign, bridge or parked truck, in which latter case the harmonic is generated internally within the receiver. If the receiver shown in FIG. 1 were not provided with the phase detector 32 of the present invention, the subtracter 28 and target display circuitry 30 would operate as usual and display a speed reading presumed to be valid when, in fact, a ghost reading is being displayed. This is because the validity circuits associated with the wave shapers 20 and 22 are responsive to a change in frequency and, from that standpoint, the signals appear valid since each has a constant frequency.

In FIG. 2 the shift register 34 there illustrated undergoes a transition on the positive going (leading) edges of positive clock pulses. Accordingly, the first pulse 70 (FIG. 4) causes the $Q_0$ output of shift register 34 to go to the high logic level since the leading edge of pulse 70 occurs during a positive pulse 72 of the high frequency speed signal. (The high logic level is a voltage equal to the positive supply voltage, $+V$.) The next two positive transitions are also illustrated in FIG. 4 and occur at the leading edges of clock pulses 74 and 76, such transitions occurring during positive high frequency pulses 78 and 80. Therefore, the $Q_1$ and $Q_2$ outputs of the shift register 34 likewise assume the high logic level. So long as the low and high frequency speed signals remain phase coherent as in FIG. 4, the remaining register outputs $Q_3$ through $Q_7$ will likewise go high. After eight low frequency clock pulses, all eight of the shift register outputs are at the high logic level and an abort command is delivered on output lead 52. As will be explained, the abort command is also produced if all eight of the shift register outputs are at the low logic level, which would be the case in the FIG. 4 illustration if the high frequency square wave were displayed in time by one-half cycle so that the positive transitions of clock pulses 70, 74, 76, etc. occur during the half cycles of the wave form (low logic level) between the positive (high logic level) pulses.

A summation of the logic levels of the eight shift register outputs appears at the summing point 40. As is evident, if all of the shift register outputs are high, maximum voltage approaching the level of the $+V$ supply will exist at point 40. If all the shift register outputs are low, then point 40 will be at a minimum voltage near the low logic level or circuit ground. Any mixture of low and high shift register outputs will cause the voltage at point 40 to be between the maximum and minimum and in the window defined by the voltage divider resistors 56, 58 and 60. The maximum or minimum voltage (all shift register outputs either high or low) causes the common output of the dual voltage comparators 48 and 50 to go from the high to the low logic level and, by the action of inverter 51, thereby generate the abort command which is delivered along lead 52 to the OR gate 24 (FIG. 1). The high logic level abort command delivered by OR gate 24 to the target display 30 prevents the display of speed information in the same manner that the target display is blanked by a miss signal from wave shaper output 20b or 22b produced by the conventional validity determining circuitry.

The presence of a mixture of low and high outputs from the shift register 34 is the normal situation and identifies the incoming high frequency Doppler component as a signal returned from a moving target vehicle, and the target speed information is displayed. Only one of the shift register outputs $Q_0$ through $Q_7$ need be at a different logic level than the remaining in order to indicate that the two speed signals at the D and CK inputs of the shift register 34 are not phase coherent.

It may be appreciated that the phase relationship between the two speed signals is rapidly recognized by the phase detector 32 since the phase comparison is complete after only eight clock pulses (eight cycles of the low frequency speed signal). Shift register 34 of eight-bit capacity has been found in practice to be an adequate sampling of the low and high frequency signals to effect the necessary determination of the phase relationship therebetween. Furthermore, minimizing the register 34 to eight bits enables the phase detector 32 to operate while the patrol vehicle is moving at relatively slow speeds as in residential areas. Some effective lengthening of the number of bits is provided in the circuit of FIG. 2 by the integrating capacitor 46.

In the alternative embodiment of FIG. 3, the analog voltage comparator circuitry utilized in FIG. 2 is replaced by the AND gate 62, NOR gate 64 and OR gate 66. As is evident from the logic, the output of the AND gate 62 will go to the high level whenever all eight of its inputs are high, which will occur when all eight outputs of the shift register 34 are high. Similarly, the NOR gate 64 delivers a high level output whenever all eight of its inputs are low, and this condition exists when all eight outputs of the shift register 34 are low. Therefore, any mixture of shift register outputs will result in the output of the OR gate 66 remaining at the low logic level since neither the AND gate 62 nor the NOR gate 64 will respond. As in FIG. 2, a high logic level output on lead 52 from OR gate 66 constitutes an abort command that is delivered to the target display 30.

Having thus described the invention, what is claimed as new and desired to be secured by Letters Patent is:

1. A traffic radar receiver for use on a moving patrol vehicle to identify a target vehicle and determine the speed thereof, said receiver comprising:
   means for receiving a Doppler signal having a low frequency component representing the speed of the patrol vehicle;
   processing means responsive to said Doppler signal for deriving therefrom a low frequency speed signal corresponding to said low frequency component, and a high frequency speed signal of unknown validity;
   detector means coupled with said processing means and responsive to said speed signals for producing an abort command if the frequency of the high frequency speed signal is an exact integer multiple of the frequency of the low frequency speed signal, whereby failure to produce said abort command indicates that the high frequency speed signal is valid and representative of the speed of a moving target vehicle;
   readout means coupled with said processing means and responsive to said speed signals for deriving target speed information therefrom, and for displaying said information unless said abort command is delivered thereto; and
   circuit means interconnecting said detector means and said readout means for delivering said abort command to said readout means when said abort command is produced, whereby to prevent the display of speed information if the speed signals are harmonically related.

2. The traffic radar receiver as claimed in claim 1, wherein said detector means includes phase recognizing means for effecting the production of said abort command if the phase relationship between the two speed signals remains constant for a predetermined period of time.

3. The traffic radar receiver as claimed in claim 1, wherein said detector means includes means for comparing the phase of a predetermined number of cycles of said low frequency speed signal with the phase of said high frequency speed signal, and output means for producing said abort command if the phase relationship between the two speed signals remains constant over said number of cycles.

4. The traffic radar receiver as claimed in claim 3, wherein said comparing means comprises a shift register having a clock input responsive to said low frequency speed signal, a data input responsive to said high frequency speed signal, and a plurality of outputs, said output means being responsive to the logic conditions of said plurality of shift register outputs.

5. The traffic radar receiver as claimed in claim 4, wherein each of said shift register outputs assumes either a high or a low voltage level in response to a corresponding cycle of said low frequency speed signal, and wherein said output means comprises voltage comparator circuitry having means connected to said shift register outputs for summing the levels thereof to provide a maximum voltage when all of the shift register outputs are at the high voltage level and a minimum voltage when all of the shift register outputs are at the low voltage level, and means responsive to the maximum voltage or the minimum voltage for delivering said abort command.

6. The traffic radar receiver as claimed in claim 4, wherein said output means includes an AND gate and a NOR gate having inputs connected to corresponding outputs of said shift register, and an OR gate responsive to the output conditions of said AND and NOR gates for delivering said abort command.

7. In a traffic radar receiver for use on a moving patrol vehicle, a method of identifying a target vehicle and determining the speed thereof, said method comprising the steps of:
   receiving a Doppler signal having a low frequency component representing the speed of the patrol vehicle;
   deriving from said Doppler signal a low frequency speed signal corresponding to said low frequency component, and a high frequency speed signal of unknown validity;
   determining whether the two speed signals are harmonically related;
   deriving target speed information from said speed signals; and
   displaying said speed information unless the two speed signals are harmonically related, whereby speed information is displayed and a target vehicle thus identified only if said low and high frequency speed signals are not harmonically related.

8. In a traffic radar receiver for use on a moving patrol vehicle, a method of identifying a target vehicle and determining the speed thereof, said method comprising the steps of:
   receiving a Doppler signal having a low frequency component representing the speed of the patrol vehicle;
   deriving from said Doppler signal a low frequency speed signal corresponding to said low frequency component, and a high frequency speed signal of unknown validity;
   recognizing the phase relationship between the two speed signals;
   deriving target speed information from said speed signals; and
   displaying said speed information unless the phase relationship between the two speed signals remains constant for a predetermined period of time, whereby speed information is not displayed if said low and high frequency speed signals are phase coherent.

9. In a traffic radar receiver for use on a moving patrol vehicle, a method of identifying a target vehicle and determining the speed thereof, said method comprising the steps of:
   receiving a Doppler signal having a low frequency component representing the speed of the patrol vehicle;

deriving from said Doppler signal a low frequency speed signal corresponding to said low frequency component, and a high frequency speed signal of unknown validity;

comparing the phase of a predetermined number of cycles of said low frequency speed signal with the phase of said high frequency speed signal;

deriving target speed information from said speed signals; and displaying said speed information unless the phase relationship between the two speed signals remains constant over said number of cycles, whereby speed information is not displayed if said low and high frequency speed signals are phase coherent.

* * * * *